United States Patent [19]
Zanft

[11] 3,822,987
[45] July 9, 1974

[54] THERMAL STERILIZER FOR CONTAMINATED AIR

[75] Inventor: Auram B. Zanft, New York, N.Y.

[73] Assignee: Morse Boulger, Inc., New York, N.Y.

[22] Filed: Jan. 29, 1973

[21] Appl. No.: 327,637

[52] U.S. Cl. ............................... 431/353, 432/222
[51] Int. Cl. ............................................ F23d 15/02
[58] Field of Search ............ 431/353, 350; 432/222

[56] References Cited
UNITED STATES PATENTS

| | | | |
|---|---|---|---|
| 3,685,950 | 8/1972 | Nomaguchi et al. | 431/350 |
| 3,728,071 | 4/1973 | Mutchler | 431/353 |
| 3,738,816 | 6/1973 | Hirt | 431/353 |

*Primary Examiner*—John J. Camby
*Attorney, Agent, or Firm*—Mason, Fenwick & Lawrence

[57] ABSTRACT

A thermal sterilizer for contaminated air generally including a housing having means defining a plenum chamber, inlet means for admitting contaminated air into the plenum chamber, means defining a combustion chamber, an outlet for discharging gaseous products of combustion therefrom and means defining an elongated, tortuous passageway intercommunicating the combustion chamber and the outlet means, and a burner mounted on the housing, the burner having a mixing chamber communicating with the combustion chamber, a blower having an inlet communicating with the plenum chamber and an outlet communicating with the mixing chamber for injecting contaminated air from the plenum chamber into the mixing chamber of the burner, means for injecting fuel into the mixing chamber, and means for igniting the fuel-contaminated air mixture.

14 Claims, 4 Drawing Figures

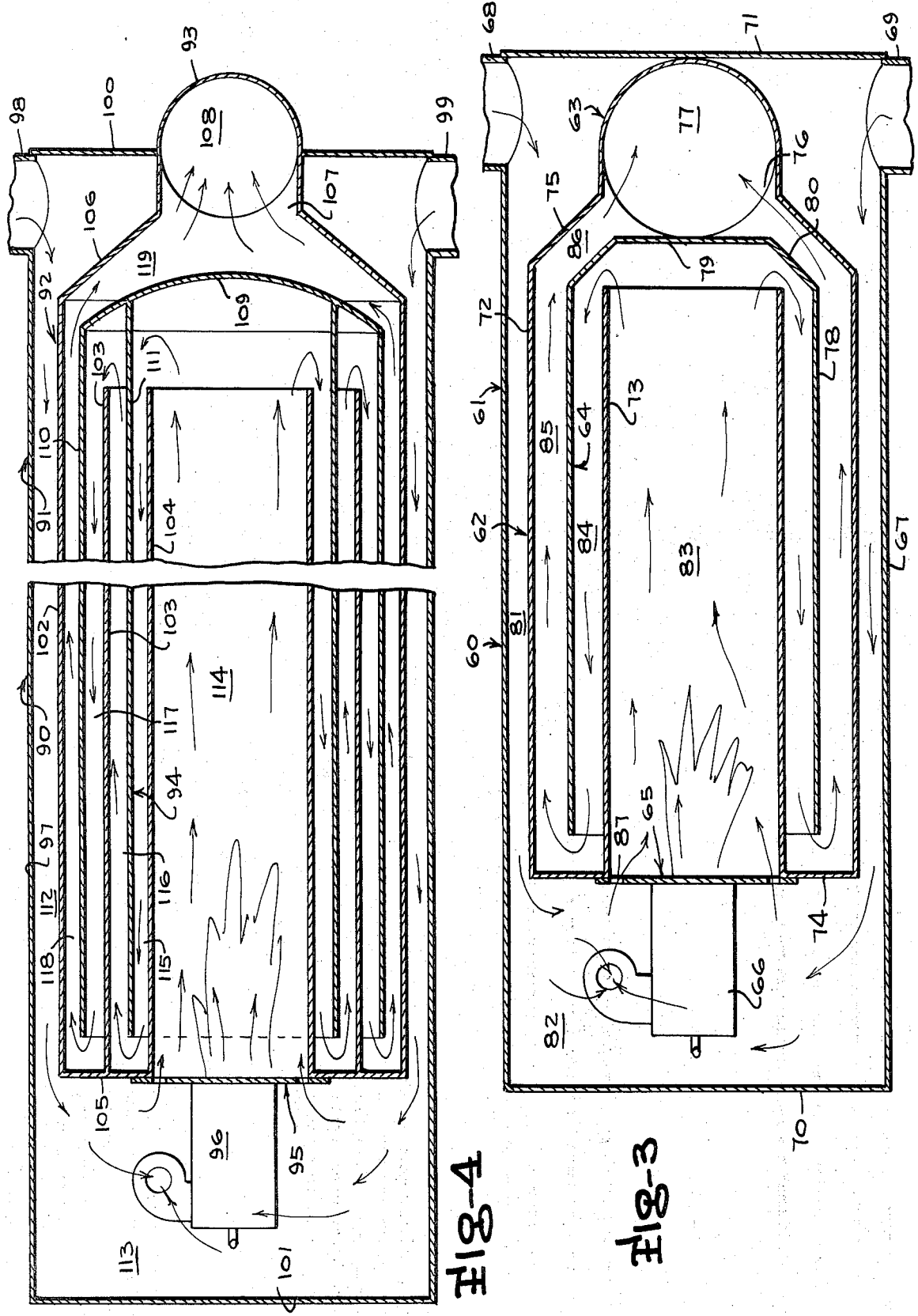

THERMAL STERILIZER FOR CONTAMINATED AIR

The present invention relates to a sterilizer and more particularly to a thermal sterilizer for contaminated air.

In many installations such as biological research facilities and the like, disease producing microorganisms often contaminate the surrounding air. Unless such contaminated air is sterilized prior to being discharged into the atmosphere, serious health hazards could result. In the prior art, various types of devices have been utilized for thermally sterilizing contaminated gases. It has been found however that such devices have not been entirely satisfactory in sterilizing such air effectively and economically.

Accordingly, it is the principal object of the present invention to provide a novel sterilizer.

Another object of the present invention is to provide a novel thermal sterilizer for contaminated air.

A further object of the present invention is to provide a novel device suitable for use at facilities where the surrounding air may be contaminated with disease producing microorganisms for thermally sterilizing such contaminated air prior to discharging such air into the atmosphere.

A still further object of the present invention is to provide a novel device for thermally sterilizing contaminated air which is effective in thoroughly sterilizing a wide range of disease producing microorganisms.

Another object of the present invention is to provide a novel thermal sterilizer for air contaminated with disease producing microorganisms which is comparatively simple in construction, effective in performance and economical in operation.

Other objects and advantages of the present invention will become more apparent to those persons having ordinary skill in the art to which the present invention pertains, from the following description taken in conjunction with the accompanying drawings wherein:

FIG. 3 is a horizontal sectional view of a second embodiment of the invention; and FIG. 4 is a horizontal cross-sectional view of a third embodiment of the invention.

Briefly, described, the present invention relates to a thermal sterilizer for contaminated air generally including a housing having means defining a plenum chamber, inlet means for admitting contaminated air into the plenum chamber, means defining a combustion chamber, an outlet for discharging gaseous products of combustion therefrom and means defining an elongated, tortuous passageway intercommunicating the combustion chamber and the outlet means, and a burner mounted on the housing means, having a mixing chamber communicating with the combustion chamber, a blower having an inlet communicating with the plenum and an outlet communicating with the mixing chamber for injecting contaminated air drawn from the plenum chamber into the mixing chamber of the burner, means for injecting fuel into the mixing chamber, and means for igniting the fuel-contaminated air mixture.

Figure 1:
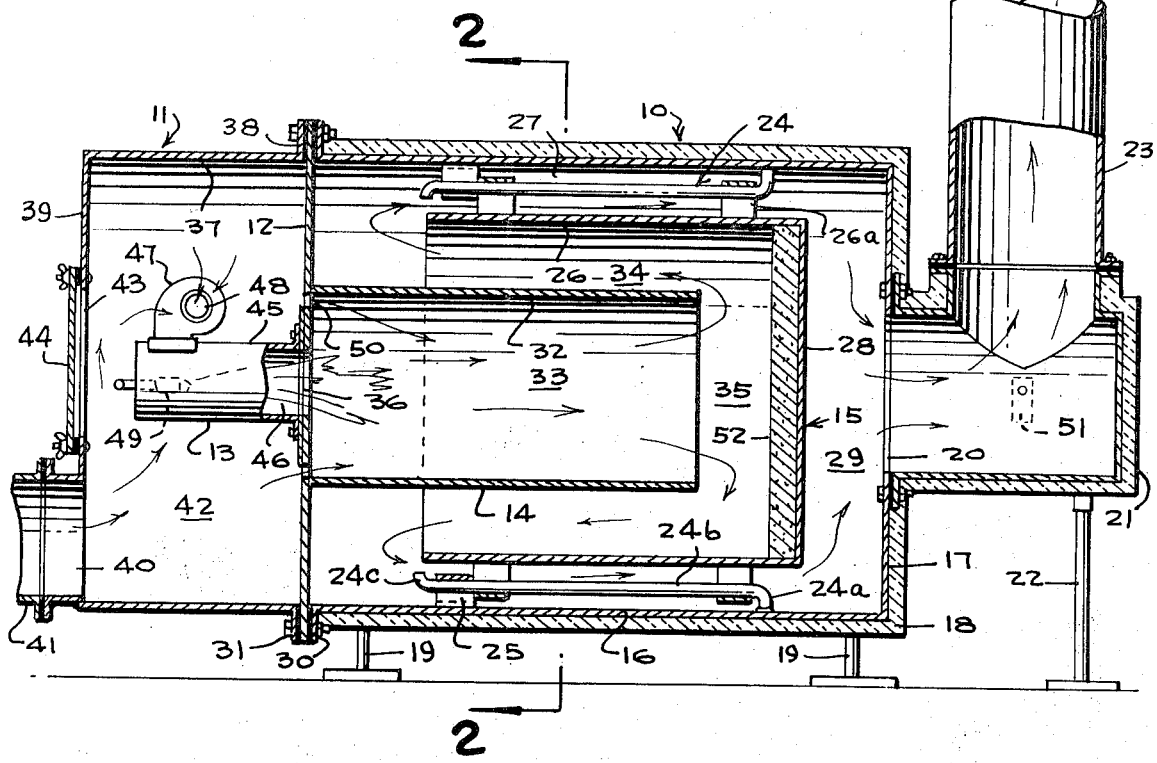
FIG. 1 is a vertical cross-section view of an embodiment of the invention.
Figure 2:
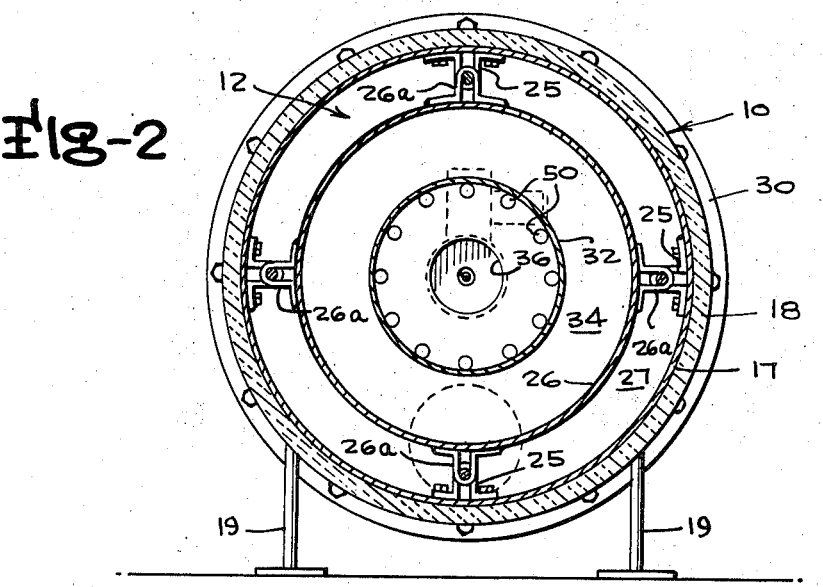
FIG. 2 is a cross-sectional view taken along line 2—2 in FIG. 1.

Referring to FIGS. 1 and 2, there is illustrated an embodiment of the invention. Generally the embodiment consists of housing sections 10 and 11, a partition wall 12, a burner 13, a cylindrical conduit 14 and a baffle member 15. Housing section 10 includes a cylindrical wall 16 and an end wall 17 preferably provided with a coating 18 of insulating material, and is supported on a plurality of legs 19. End wall 17 is provided with an opening 20 disposed coaxially relative to cylindrical wall 16, with communicates with an exhaust conduit 21 secured to the end wall 17 and supported at its outer end on support legs 22. The interior of housing section 10 communicates through opening 20 and conduit 21 to a flue 23 connected to the upper end of a conduit 21.

Circumferentially spaced within the housing chamber and rigidly secured to the cylindrical wall 16, is a plurality of hanger members 24. Each of such members is provided with a forwardly disposed, radially projecting portion 24a and an elongated, longitudinally disposed portion 24b having an inwardly turned free end 24c. The longitudinal portions 24b are spaced closely to the cylindrical wall 16 and the ends thereof are restrained from inward movement by U-shaped brackets 25 detachably secured to the cylindrical wall 16, preferably by bolts, as best illustrated in FIG. 2.

Baffle member 15 consists of a cylindrical wall 26 spaced from cylindrical wall 16 to provide an annular passageway 27, and an end wall 28 spaced from end wall 17 to provide a cylindrical space 29 intercommunicating the annular space 27 and opening 20. The opposite end of cylindrical wall 26 is spaced from partition wall 20. The baffle member is supported on hanger members 24 by means of a plurality of circumferentially spaced pairs of inverted U-shaped brackets or straps 26a straddling the longitudinal portions 24b of the hanger members.

The rearward end of cylindrical wall 16 is provided with an annular flange 30 to which the periphery of partition wall 12 is secured by means of bolts 31. Mounted on the front side of partition wall 12 is a cylindrical conduit 32 projecting into baffle member 15, defining a combustion chamber 33. Conduit 32 is spaced concentrically from cylindrical wall 26 to provide an annular space 34 therebetween, and has the free end thereof spaced from end wall 28 to provide a cylindrical space 35 intercommunicating combustion chamber 33 and annular chamber 34. Partition wall 12 further is provided with an opening 36 disposed axially relative to cylindrical conduit 32. It thus will be seen that housing section 10, partition wall 12, baffle member 15 and cylindrical conduit 32 provide a tortuous passageway intercommunicating the opening 36 in the partition wall 12 with opening 20.

Housing section 11 consists of a cylindrical wall 37 provided with an annular flange 38 for securing housing section 11 to partition wall 12 by means of bolts 31, and an end wall 39. An inlet opening 40 is provided in end wall 39 which communicates with a duct 41 for admitting contaminated air into plenum chamber 42 defined by the housing section 11 and partition wall 12. The end wall 39 further is provided with an access opening 43 normally closed by a cover panel 44.

The burner 13 includes a cylindrical member 45 mounted at its front end on partition wall 12. The rear end thereof is closed to provide a mixing chamber 46 communicating through opening 36 in the partition wall with the combustion chamber 33. Mounted on cylindrical member 45 is a blower 47 having an inlet 48 communicating with plenum chamber 42 and an outlet communicating with mixing chamber 46 so that upon operation of the blower, contaminated air in the plenum chamber will be drawn through the blower and injected into the mixing chamber 46. The burner further is provided with a nozzle 49 connected to a fuel supply for injecting fuel into the mixing chamber, and means for igniting the fuel-contaminated air mixture within the mixing chamber 46.

It is intended that the major portion of the contaminated air in the plenum chamber be injected by the blower into the mixing chamber of the burner to provide optimum mixing of the contaminated air with the fuel in the mixing chamber and, correspondingly, optimum combustion. Contaminated air injected into the mixing chamber functions as primary air for supporting combustion. Excess air in the plenum chamber may pass through a plurality of openings 50 in partition wall 12, into combustion chamber 33 to provide secondary air for combination. The operation of the burner is controlled by a conventional control system well known in the art which includes a temperature regulator responsive to the temperature of the gases conducted to the flue 23. Such regulator includes a thermocouple 51 mounted on conduit 21.

The design of the components of the embodiment as described, readily permits the assembly and disassembly of the sterilizer. In assembling the embodiment, housing section 10 first is positioned at the desired location, conduit 21 is secured to the end wall of the housing section, and conduit 21 also is connected to flue 23. Baffle member 15 than is mounted within housing section 10 by aligning the pairs of brackets 26a with longitudinal portions 24b of hanger members 24 and then sliding the baffle member forwardly into housing section 10 so that the longitudinal portions 24b of the hanger members are received within the aligned pairs of brackets 26a. Once the baffle member is supported on the hanger members, it will be properly spaced relative to housing section 10 and further may be secured into position by mounted retaining lugs 25. Partition wall 12 with cylindrical conduit 32 then is mounted on the open end of housing section 10 so that the bolt openings about the periphery of the partition wall register with the bolt holes in flanges 30 and cylindrical conduit 32 projects into the baffle member 28, as illustrated in FIG. 1. With the baffle wall 12 held either permanently in place or temporarily pending the mounting of housing section 11, the burner 13 is mounted on partion wall 11. Housing section 11 is then mounted on the partition wall by means of bolts 31 securing the housing sections and partition wall together, and housing section 11 is connected to the contaminated air supply conduit 41. The assembly of the sterilizer is completed by installing the burner control system. Disassembly of the embodiment is accomplished essentially by following the procedure as described in reverse order. While the sterilizer is assembled, access to the burner for maintenance and other purposes, is provided through opening 43 by removing the cover panel 44.

In the operation of the sterilizer as described, contaminated air admitted through inlet opening 40 into plenum chamber 42 is drawn into blower 47 and injected into mixing chamber 46 of the burner where it is thoroughly mixed with fuel injected into the mixing chamber by fuel nozzle 49, and ignited. Contaminated air injected into the mixing chamber functions as primary air to support combustion in chamber 33. Excess air in the plenum chamber is caused to pass through openings 50 in the partition wall to provide secondary air for combustion in the chamber 33. The products of combustion are caused to traverse the length of combustion chamber 33, and then flow through passageways 35, 34, 27, 29 and through conduit 21 into flue 23. In traversing such tortuous path, the residence time of the burning gases is prolonged to insure complete combustion of the pathogens in the contaminated air. As best seen in FIG. 1, end wall 28 of the baffle member is provided with a fire resistant coating 52, preferably a refractor material, to protect the end wall of the baffle member from the flame of combustion produced in the combustion chamber 33.

Thermocouple 51 functions to sense the temperature of the gases conducted to flue 23 so that the temperature regulator of the control system will insure a predetermined temperature required to destroy all microorganisms in the air being treated. In this regard, it will be appreciated that the temperature of the outgoing gases and the residence time of the burning gases is adjusted in accordance with the nature of the pathogens in the contaminated air being treated.

For highly contaminated air, embodiments of the invention as illustrated in FIGS. 3 and 4 would be most suitable. Referring to FIG. 3, there is illustrated a sterilizer 60 generally consisting of a housing 61, an outer baffle member 62, an exhaust conduit 63, an inner baffle member 64, a partition wall 65 and a burner 66. The sterilizer 60 essentially is a modification of the embodiment illustrated in FIGS. 1 and 2 and function in substantially the same manner to sterilize contaminated air admitted into the housing 61.

Housing 61 includes a cylindrical wall 67 provided with forwardly disposed inlets communicable with contaminated air supply ducts 68 and 69, and a pair of end walls 70 and 71. The housing further is provided with suitable means for supporting the sterilizer and suitable means for obtaining access to the interior of the housing. Baffle member 62 includes an outer cylindrical wall 72 spaced inwardly from cylindrical wall 67 of the housing, an inner cylindrical wall 73 spaced inwardly from cylindrical wall 74, an annular rear end wall 74 and a frusto-conically shaped front end wall 75 providing an opening 76 communicating with the exhaust chamber 77 provided by exhaust duct 63. It will be understood that the exhaust duct 63 extends through the cylindrical wall 67 of the housing and communicates with a flue. Although not specifically illustrated, it is to be noted that baffle member 62 is supported within the housing on a plurality of circumferentially spaced hanger members mounted on cylindrical wall 67 similar to the hanger member arrangement provided in the embodiment illustrated in FIGS. 1 and 2 of the drawings.

Inner baffle member 64 includes a cylindrical wall 78 spaced between cylindrical walls 72 and 73 of the outer baffle member, and a front end wall 79 having a frusto-conically shaped section 80 disposed substantially parallel to the frusto-conically shaped front end wall 75 of the outer baffle member. It will be noted that the rearward end of cylindrical wall 78 is spaced from annular rear end wall 74 of the outer baffle member, and the frusto-conically shaped section 80 is spaced forwardly of the front end of cylindrical wall 73. The inner baffle member is supported within the outer baffle member on a plurality of hanger members rigidly mounted on either of cylindrical walls 72 and 73 of the outer baffle member in the manner as previously described.

Partition wall 65 is mounted on annular rear end wall 74 to close the opening therein. It thus will be seen that such arrangement provides an annular passageway 81 communicating with the front end of the housing and contaminated air supply conduits 68 and 69, a plenum chamber 82 disposed at the rear end of the housing and communicating with a combustion chamber 83 defined by the cylindrical wall 73 and partition wall 65, and annular chambers 84 and 85 defined by cylindrical walls 73, 64 and 72 and annular end wall 74, communicating combustion chamber 82 with the exhaust chamber 77 through a connecting passageway 86. Burner 66 is similar in construction and operation to burner 13 described in connection with the embodiment illustrated in FIGS. 1 and 2.

In the operation of the embodiment illustrated in FIG. 3, contaminated air admitted into the housing 61 through supply conduits 68 and 69 is caused to flow rearwardly through annular passageway 81 into plenum chamber 82. As such air traverses passageway 81, it passes in heat exchange relationship with cylindrical wall 72 of baffle member 62 thus being preheated. Air within the plenum chamber is drawn through the blower of the burner and injected into the mixing chamber thereof where it is thoroughly mixed with fuel and ignited. The resultant burning gases are injected through an opening in partition wall 65 into the combustion chamber 83. Contaminated air injected into the mixing chamber functions as primary air and excess air in the plenum chamber injected into the combustion chamber through openings 87 functions as secondary air to support combustion in the chamber 83. The gaseous products of combustion emanating from chamber 83 are caused to flow through passageways 84, 85 and 86 into exhaust chamber 77 as they continue to burn, and then are conducted to the flue to be discharged into the atmosphere. In this particular embodiment, it will be noted that the structural relationship of the inner and outer baffle members provides an elongated tortuous path for the products of combustion which further provides a prolonged predetermined residence time for the gases thus insuring combustion thereof. The efficiency of such emodiment is enhanced by the preheating of the incoming contaminated gases as they pass through passageway 81, and the prolongation of the residence time of the gases.

The embodiment depicted in FIG. 4 is similar to the embodiments illustrated in FIGS. 1 through 3 of the drawings, and differs significantly from the embodiment illustrated in FIG. 3 only with respect to the construction of the inner and outer baffle members. In particular, the embodiment illustrated in FIG. 4 consists of a sterilizer 90 including a housing 91, an outer baffle member 92 mounted within the housing, communicating with an exhaust conduit 93, an inner baffle member 94 mounted on the outer baffle member, a partition wall 95 and a burner 96.

Housing 91 consists of a cylindrical wall 97 provided within inlet openings communicating with contaminated air supply conduits 98 and 99, a front end 100 and a rear end wall 101. Deviating slightly from the embodiment shown in FIG. 3, exhaust conduit 93 is mounted on front end wall 10 and the forward end of cylindrical wall 97.

Outer baffle member 92 is mounted on cylindrical wall 97 in the manner as previously described and includes spaced cylindrical walls 102, 103 and 104, an annular rear end wall 105, and a frusto-conically shaped end wall 106 provided with an exhaust chamber 108 defined by conduit 93. Inner baffle member 94 is mounted on outer baffle member 92 also in the manner as previously described, and consists of a crowned front end wall 109 and cylindrical walls 110 and 111 spaced between cylindrical walls 102, 103 and 104. Partition wall 95 is mounted on annular rear end wall 105 across the opening thereof, and burner 96 is mounted on the partition wall. The burner 96 also is similar in construction and operation to burner 13 described in connection with the embodiment illustrated in FIGS. 1 and 2.

The arrangement described provides an annular passageway 112 communicating with the front end of the housing and contaminated air supply conduits 98 and 99, a plenum chamber 113 disposed at the rear end of the housing, communicating with passageway 112, a combustion chamber 114 defined by cylindrical wall 104 and partition wall 95, and passageways 115 through 118 defined by the cylindrical walls of the baffle members and end wall 105, communicating the combustion chamber 114 and exhaust chamber 118 through a passageway 119.

In the use of the sterilizer illustrated in FIG. 4, contaminated air admitted into the front end of the housing is caused to flow rearwardly through passageway 112 thus being preheated. The preheated air then is drawn from the plenum chamber 113 by the blower and injected into the mixing chamber of the burner where it is thoroughly mixed with fuel and ignited to provide combustion of the gases in chamber 114. The products of combustion emanating from the combustion chamber are caused to flow through passageways 115 through 119 into exhaust chamber 118 wherefrom the gases are conducted to the flue and eventually discharged into the atmosphere. In this particular embodiment it will be noted that by the use of additional cylindrical walls in the inner and outer baffle members, an elongated tortuous passageway resembling a labyrinth is provided which functions to prolong the residence time of the gases emanating from the combustion chamber thus insuring complete combustion and, correspondingly, optimum sterilization of the gases flowing into exhaust chamber 118 and eventually emitted into the atmosphere.

The components of the embodiments illustrated in FIGS. 1, 3 and 4 also may be prefabricated to facilitate erection at the final installation site. The means fo mounting the inner and outer baffle members of the embodiments greatly facilitates the erection of such embodiment at the installation site.

From the foregoing detailed description, it will be evident that there are a number of changes, adaptations and modifications of the present invention which come within the province of those persons having ordinary skill in the thermal sterilizer art. However, it is intended that all such variations not departing from the spirit of the invention be considered as within the scope thereof as limited solely by the appended claims.

I claim:

1. A thermal sterilizer for contaminated air comprising a housing having means defining a plenum chamber, inlet means for admitting contaminated air into said plenum chamber, means defining a combustion chamber, an outlet for discharging gaseous products of combustion therefrom and means defining an elongated, tortuous passageway intercommunicating said combustion chamber and said outlet means, and a burner mounted on said housing, said burner having a mixing chamber communicating with said combustion chamber, a blower having an inlet communicating with said plenum chamber and an outlet communicating with said mixing chamber for injecting contaminated air into said mixing chamber of said burner, means for injecting fuel into said mixing chamber, and means for igniting the fuel-contaminated air mixture.

2. A thermal sterilizer according to claim 1 wherein said housing means includes means defining passageways intercommunicating said plenum and combustion chambers, whereby the major portion of the contaminated air in said plenum chamber is injected by said blower to the mixing chamber of said burner as primary air for supporting combustion and any excess portion of said contaminated air in said plenum chamber is supplied to said combustion chamber as secondary air for further supporting the combustion of the fuel-air mixture injected into said combustion chamber and sterilization of said secondary air.

3. A thermal sterilizer according to claim 2 wherein the passageway intercommunicating said plenum and combustion chambers are such that no less than 80 percent of the contaminated air in said plenum chamber is supplied through said blower to the mixing chamber of said burner.

4. A thermal sterilizer according to claim 1 wherein said passageway intercommunicating said combustion chamber and said outlet means defines a labyrinth.

5. A thermal sterilizer according to claim 1 wherein said means defining an elongated, tortuous passageway intercommunicating said combustion chamber and said outlet means includes at least one longitudinally disposed conduit, said housing includes at least one hanger member having a longitudinally disposed portion, and said conduit includes at least one lug for suspending said cylindrical wall on the longitudinally disposed portion of said hanger member within said housing.

6. A thermal sterilizer according to claim 1 wherein said means defining an elongated, tortuous passageway intercommunicating said combustion chamber and said outlet means includes a plurality of cylindrical walls providing a labyrinth, said housing includes a plurality of hanger members spaced circumferentially relative to said cylindrical wall, having longitudinally disposed portions, and an outer one of said cylindrical walls includes circumferentially spaced, pairs of lugs operatively connected to the longitudinally disposed portions of said hanger members for supporting said cylindrical walls in said housing.

7. A thermal sterilizer for contaminated air comprising a first housing section including a cylindrical wall and an end wall, said end wall having an opening communicable with a flue, a baffle member mounted in said first housing section including a cylindrical wall disposed concentrically relative to cylindrical wall of said first housing section to provide an annular space therebetween and an end wall spaced from the end wall of said first housing section, means for supporting said baffle member within said first housing section, a partition wall mounted on the open end of said first housing section, said partition wall having an opening disposed axially relative to the cylindrical wall of said first housing section and being spaced from the open end of said baffle member, a cylindrical conduit mounted on said partition wall and projecting into said baffle member, said cylindrical conduit having the free end thereof being spaced from the end wall of said baffle member whereby said cylindrical conduit defines a combustion chamber communicating with the opening in said partition wall and said outlet opening through a tortuous passageway defined by said cylindrical conduit, said baffle member, said partition plate and said first housing section, a second housing section mounted on said partition wall defining a plenum chamber, said second housing section having an inlet opening communicable with a conduit for admitting contaminated air to be sterilized into said plenum chamber, and a burner mounted on said partition wall within said plenum chamber, said burner including means defining a mixing chamber communicating through said opening in said partition wall with said combustion chamber, a blower for injecting air from said plenum chamber into said mixing chamber, means for injecting fuel into said mixing chamber and means for igniting said fuel-contaminated air mixture.

8. A thermal sterilizer according to claim 7 including at least one opening in said partition wall intercommunicating said plenum and combustion chambers for admitting excess contaminated air from said plenum chamber into said combustion chamber to provide a secondary air for supporting combustion with said combustion chamber.

9. A thermal sterilizer according to claim 7 wherein said means for supporting said baffle within said first housing section comprises a plurality of circumferentially spaced hanger members rigidly mounted on the cylindrical wall of said first housing section, each of said hanger members having a longitudinally disposed portion, and a plurality of circumferentially spaced pairs of lugs rigidly mounted on the cylindrical wall of said baffle members operatively connected to the longitudinal portions of said hanger member.

10. A thermal sterilizer according to claim 7 wherein said partition wall and said baffle member are provided with additional cylindrical walls defining a labyrinth.

11. A thermal sterilizer according to claim 1 including means for sensing the temperature of gases discharged through said outlet means and means responsive to said sensing means for controlling the operation of said burner to provide a predetermined temperature of said discharged gases.

12. A thermal sterilizer according to claim 7 including means for preheating said contaminated air injected into said plenum chamber.

13. A thermal sterilizer according to claim 12 wherein said means for preheating said contaminated air includes means for passing said air into heat exchange relationship with said baffle member.

14. A thermal sterilizer according to claim 7 wherein the cross-sectional areas of the various labyrinth passages are designed for a predetermined velocity of the gases of combustion, to provide a predetermined residence time at a predetermined temperature for the complete destruction of the air-borne pathogens or other contaminants to produce a sterile discharge into the atmosphere.

* * * * *